United States Patent
Liu et al.

(10) Patent No.: US 8,886,735 B1
(45) Date of Patent: Nov. 11, 2014

(54) ELECTRONIC MESSAGES USING PREDEFINED TEMPLATES

(75) Inventors: Jia Liu, Sunnyvale, CA (US); Xincheng Zhang, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 357 days.

(21) Appl. No.: 13/370,257

(22) Filed: Feb. 9, 2012

(51) Int. Cl.
*G06F 15/16* (2006.01)

(52) U.S. Cl.
USPC .......................................... 709/206; 715/752

(58) Field of Classification Search
CPC .......................... G06Q 10/107; H04M 1/72552
USPC .......................................... 709/206; 715/752
See application file for complete search history.

(56) References Cited

U.S. PATENT DOCUMENTS

| | | | |
|---|---|---|---|
| 6,965,926 B1 * | 11/2005 | Shapiro et al. ................. | 709/219 |
| 7,680,892 B2 * | 3/2010 | Knox et al. ..................... | 709/206 |
| 7,721,217 B2 * | 5/2010 | Bonforte et al. ................ | 715/758 |
| 7,970,843 B2 * | 6/2011 | Brown et al. ................... | 709/206 |
| 8,320,531 B2 * | 11/2012 | Visser .......................... | 379/88.01 |
| 2005/0210114 A1 * | 9/2005 | Washburn ..................... | 709/206 |
| 2007/0118603 A1 * | 5/2007 | Washburn et al. ............. | 709/206 |
| 2008/0021964 A1 * | 1/2008 | Inbarajan ...................... | 709/206 |
| 2009/0106650 A1 * | 4/2009 | Haynes et al. ................. | 715/255 |
| 2010/0049812 A1 * | 2/2010 | Brown et al. .................. | 709/206 |
| 2010/0250477 A1 * | 9/2010 | Yadav ........................... | 706/14 |
| 2011/0078586 A1 * | 3/2011 | Wittig .......................... | 715/752 |
| 2011/0225253 A1 * | 9/2011 | Brown et al. .................. | 709/206 |

\* cited by examiner

*Primary Examiner* — Oanh Duong

(74) *Attorney, Agent, or Firm* — McDermott Will & Emery LLP

(57) ABSTRACT

A computer-implemented method for sending a personalized electronic message using predefined templates including personalization symbols is provided. The method includes receiving a selection of an electronic message template from a user, wherein the electronic message template is stored in a data structure and wherein the electronic message template comprises a predefined personalization symbol for personalizing the electronic message template. The method also includes obtaining the electronic message template from the data structure, and generating content for inclusion in a personalized electronic message body based on the electronic message template, the step of generating comprising replacing the personalization symbol, based on a predefined rule, with a default value associated with the personalization symbol. The method further includes providing a draft electronic message comprising the personalized electronic message body. Systems and machine-readable media are also provided.

19 Claims, 6 Drawing Sheets

300

Email Template 310

Hi, $f_receiver$ ,

Thanks for your message.  I will get back to you soon.

$prompt_personalized_signature$

Brian

⬇

Personalized Email Body Displayed to User 330

Hi Joe,

Thanks for your message.  I will get back to you soon.

*PLEASE TYPE IN YOUR PERSONALIZED SIGNATURE HERE* 334
Brian

⬇

Finalized Email 350

To: Joe@email.com
Subject: RE: Grad School Application

Hi Joe,

Thanks for your message.  I will get back to you soon.

Yours truly, 352
Brian

FIG. 3

ELECTRONIC MESSAGES USING PREDEFINED TEMPLATES

TECHNICAL FIELD

The present disclosure generally relates to composing electronic messages using predefined templates, and more particularly to composing and sending electronic messages using predefined templates including personalization symbols.

BACKGROUND

It may take a considerable amount of time before a user may send a meaningful response to an electronic message such as, for example, an email. If the electronic message is not quickly replied to, there is also a high likelihood that the user may forget to respond altogether. Thus, there may be a need to send brief responses to electronic messages from multiple people to make quick acknowledgements of receipt. There also may be a need to send out electronic messages to multiple recipients with similar contents. However, in sending out a brief response or sending out similar electronic messages to multiple people, there may be a further need to quickly personalize each electronic message without losing much efficiency.

SUMMARY

According to an aspect of the present disclosure, a computer-implemented method for sending a personalized electronic message using predefined templates including personalization symbols is provided. The method includes receiving a selection of an electronic message template from a user, wherein the electronic message template is stored in a data structure and wherein the electronic message template comprises a predefined personalization symbol for personalizing the electronic message template. The method also includes obtaining the electronic message template from the data structure, and generating content for inclusion in a personalized electronic message body based on the electronic message template, the step of generating comprising replacing the personalization symbol, based on a predefined rule, with a default value associated with the personalization symbol. The method further includes providing a draft electronic message comprising the personalized electronic message body.

According to another embodiment of the present disclosure, a system for sending a personalized email using predefined templates including personalization symbols is provided. The system includes a memory storing an email template comprising a predefined personalization symbol and a placeholder symbol for personalizing the email template, and storing executable instructions. The system also includes a processor configured to execute the stored executable instructions to receive a selection of the email template from a user, obtain the email template from the memory, and generate content for inclusion in a personalized email body based on the email template, the step of generating comprising replacing the personalization symbol, based on a predefined rule, with a default value associated with the personalization symbol. The processor is also configured to prompt the user to enter a custom message based on the placeholder symbol, receive the custom message from the user, and incorporate the custom message into the personalized email body. The processor is further configured to provide a draft email comprising the personalized email body to the user.

According to a further embodiment of the disclosure, a machine-readable storage medium comprising machine-readable instructions for causing a processor to execute a method for sending a personalized email using predefined templates including personalization symbols is provided. The method includes receiving a selection of an email template from a user, wherein the email template is stored in a data structure and wherein the email template comprises a predefined personalization symbol and a placeholder symbol for personalizing the email template. The method also includes obtaining the email template from the data structure and generating content for inclusion in a personalized email body based on the email template, the step of generating comprising replacing the personalization symbol, based on a predefined rule, with a default value associated with the personalization symbol, and replacing the placeholder symbol with a prompt message for prompting the user to enter a custom message. The method further includes receiving the custom message, incorporating the custom message into the personalized email body, and providing an email comprising the personalized email body to a recipient.

BRIEF DESCRIPTION OF THE DRAWINGS

A detailed description will be made with references to the accompanying drawings:

FIG. 3 is a conceptual diagram illustrating an example process of the system for sending email using predefined templates according to certain aspects of the disclosure.

DETAILED DESCRIPTION

Figure 1:
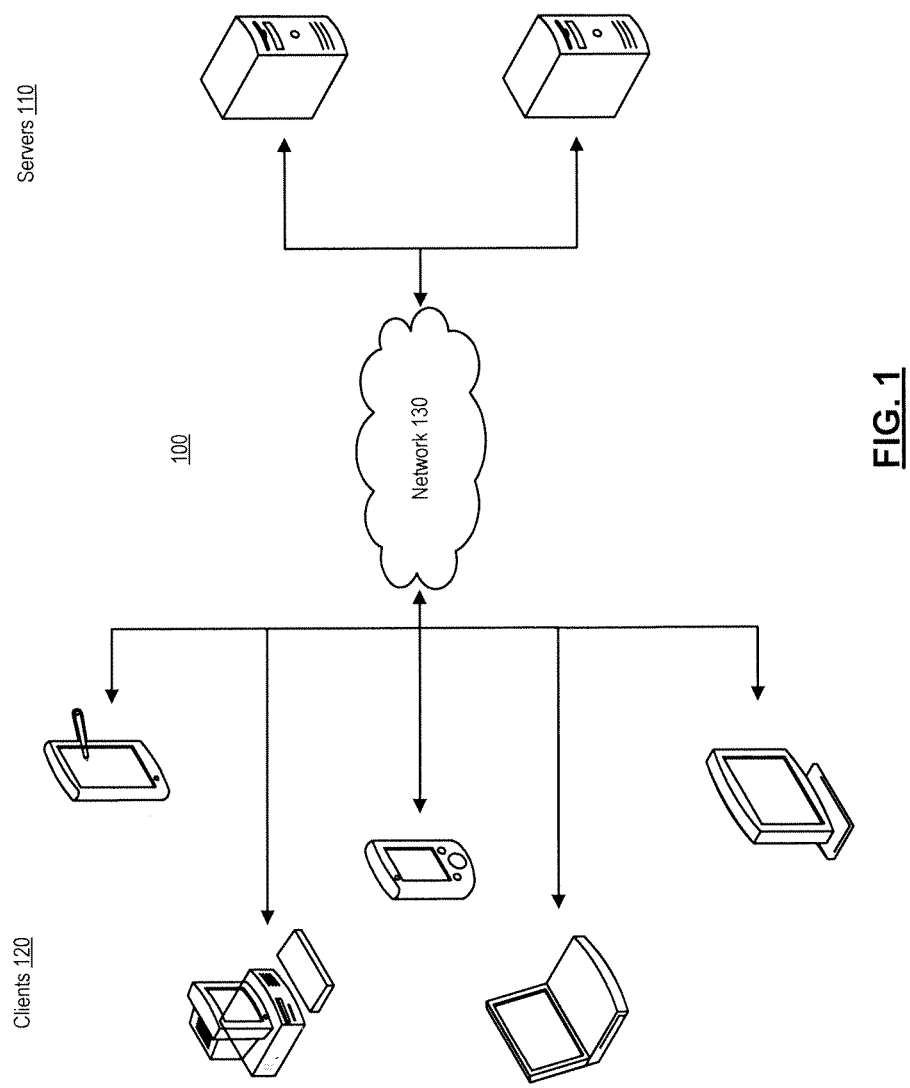
FIG. 1 illustrates an example system for sending email using predefined templates ("system") according to certain aspects of the disclosure.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

According to the various aspects of the subject technology, systems and methods for sending electronic messages using predefined templates are provided. A user of an electronic message such as, for example, email, may wish to quickly send out a message in response to a received message, or may wish to quickly send out multiple messages to multiple recipients. For example, the user may wish to send out a quick reply on the go, or confirm receipt of numerous applications for a graduate school program. Standard-language emails may be used for such instances. Such emails typically contain identical, generic contents which apply to all recipients and usually address the recipients with generic greetings such as, for example, "To whom it may concern," or "Dear Sir/Madam."

The standard language emails provide an efficient means of acknowledging receipt of emails or sending out emails to multiple recipients. However, there may be a need to add some personalization to the emails without sacrificing the efficiency of having standard languages. For example, users may wish to use a standard language, but address the recipient by his or her first name, or may wish to add a personalized signature. While the descriptions below will generally refer to emails, other types of electronic messages such as, for example, text messages, instant messaging service messages, blog posts, and social networking service posts may also be used.

The system may provide one or more predefined email templates which a user may select to use as a basis for an email. Each template may be a standard language email message containing personalization symbols which are automatically replaced with default values based on predetermined rules. The personalization symbols may represent a variety of aspects of an email which the user may wish to have personalized. For example, a symbol "$f_receiver$" may represent the first name of the recipient. Thus when a user selects a template including the symbol "$f_receiver$", the system may replace the symbol with the first name of the recipient.

The actual values represented by the symbols may be obtained in a variety of ways, depending on what type of values the symbols represent. In the foregoing example, the first name of the recipient may be determined by looking up the user's contact list based on the email address entered in the "To:" field. Other symbols may include, for example, a symbol representing today's date, the recipient's address, and the sender's full name. The actual values represented by these types of symbols may be obtained, for example, from the system calendar (date), contact list (recipient's address), or system settings (sender's full name).

After the system has replaced the symbols with their corresponding default values according to the predetermined rules, the user may review the default values and may either keep the default values or override them. For example, after the system replaces the symbol "$f_receiver$" with the first name of the recipient, the user may decide that it would be more appropriate to address the recipient by his or her last name, and manually type in the last name in place of the first name.

Another type of symbol may be provided to serve as placeholders to prompt the user to type in a custom message to the recipient. For example, in a template for sending a quick response to a graduate school application, the symbol may serve as a placeholder and prompt the sender to type in a message which makes specific references to parts of the recipient's application. Unique placeholder symbols are associated with different prompt messages to which the symbols may be converted upon application of the template. The personalization symbols may be predefined in the system, or the symbols and their associated prompt messages may be received from the user. For example, the system may include a predetermined symbol "$prompt_personalized_signature$" which is associated with the prompt message "PLEASE TYPE IN YOUR PERSONALIZED SIGNATURE HERE." As another example, the system may receive from the user a placeholder symbol "$prompt_personalized_greetings". This placeholder symbol is not predefined in the system, and the user also provides the system with the prompt message "PLEASE TYPE IN YOUR PERSONALIZED GREETING HERE," to which the placeholder symbol will be converted to upon application of the template. In the following descriptions, the symbols which are replaced with default values based on predetermined rules are referred to as "personalization symbols," and the symbols serving as placeholders to prompt the user to type in a message are referred to as "placeholder symbols."

A list of the symbols contained in the current template may be separately shown to the user. Using the list, the user may conveniently identify, review, and determine whether to override the symbols.

The system provides a user interface ("UI") for accessing the templates. The user is presented with a drop-down menu, listing the templates available to the user. The user may access the drop-down menu and select an appropriate menu item to access the desired template. Instead of a drop-down menu, other types of UI for accessing the symbols may also be provided.

The system also provides the user with a template generation UI for generating an email template. The personalization and placeholder symbols are represented as buttons on a template generation UI. The template generation UI includes two types of symbol buttons: (i) personalization symbol buttons and (ii) placeholder symbol buttons. (i) The personalization symbol buttons are provided for inserting symbols, such as a symbol representing the first name of the recipient. Buttons for inserting personalization symbols representing other types of information, such as, for example, last name and current date may also be included in the UI. The user may click on the buttons to insert the corresponding symbol. For example, if the user clicks on the button representing the first name, then the symbol $f_receiver$ is inserted in the email template. The system will automatically replace these personalization symbols with their default values based on predetermined rules if the user selects and uses the template. (ii) The placeholder symbol buttons—these buttons are provided for inserting placeholder symbols in the email template. If the user clicks this button, the system will prompt the user to enter the name of a predefined placeholder symbol. After the user enters in the name of the predefined placeholder symbol, the symbol is placed in the email template. For example, the personalization symbol $prompt_personalized_signature$ may be predefined to be associated with the prompt message "PLEASE TYPE IN YOUR PERSONALIZED SIGNATURE HERE." Therefore, if the user enters "$prompt_personalized_signature$", the symbol is placed in the email template, and this symbol the system will replace this symbol with the prompt message "PLEASE TYPE IN YOUR PERSONALIZED SIGNATURE HERE," if the email template is applied. The prompt message may also be highlighted. The user may also provide a user-defined placeholder symbol and its associated message prompt.

Turning to the drawings, FIG. 1 illustrates an example system 100 for sending email using predefined templates. The system 100 includes servers 110 and clients 120 connected over a network 130. Each of the clients 120 may interact with users, and communicate with the servers 110 to compose and send emails using templates. The servers 110 may be any device having an appropriate processor, memory, and communications capability for communicating with the clients 120 and sending emails. The clients 120 may be, for example, desktop computers, laptop computers, mobile devices (e.g., a smart phone, tablet computer, or PDA), set top boxes (e.g., for a television), televisions, video game consoles, home appliances (e.g. a refrigerator, microwave oven, washer, or dryer) or any other devices having appropriate processor, memory, and communications capabilities. The network 130 may include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like. The system 100 may comprise only servers 110, or may comprise only clients 120, in communication with the network 130.

Figure 2:
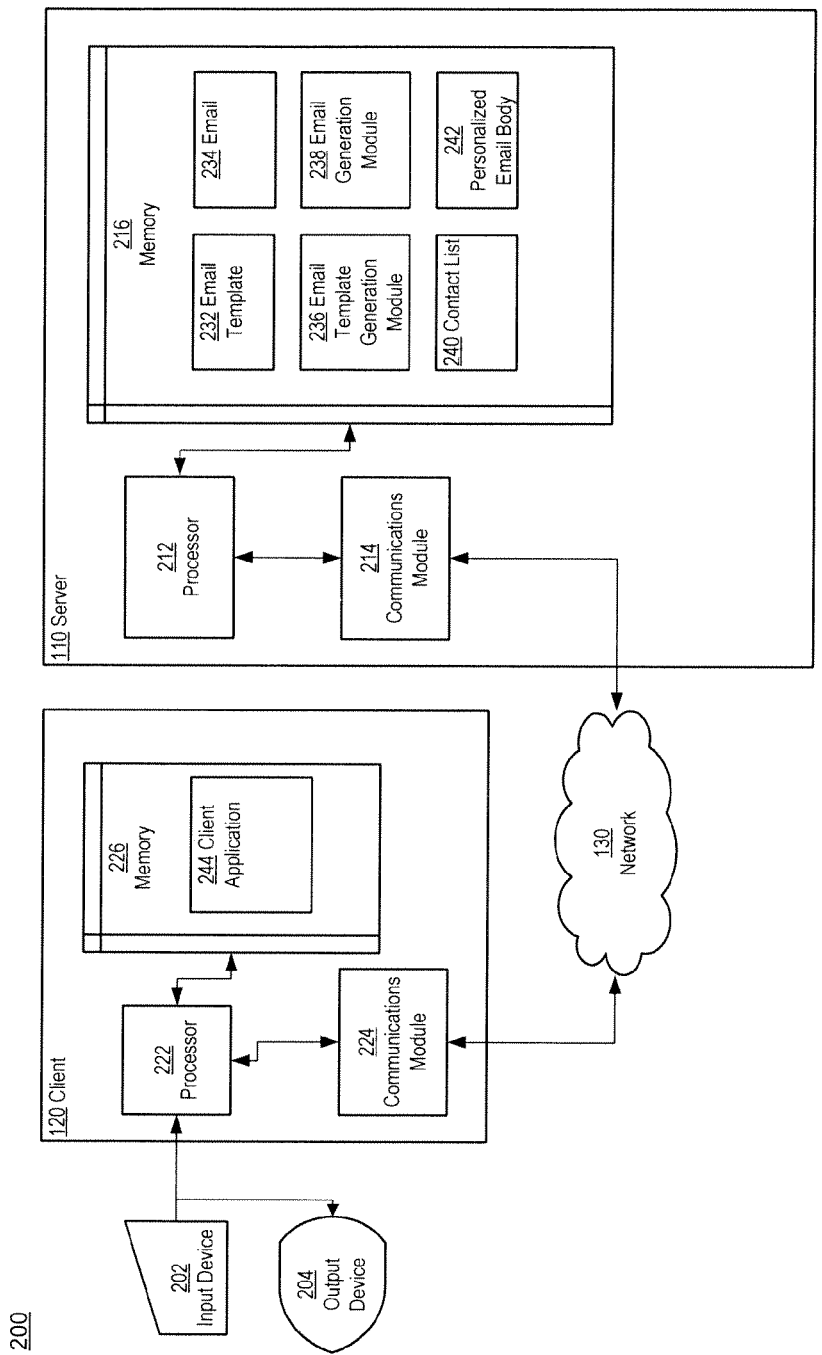
FIG. 2 is a block diagram illustrating an example server and a client in the system of FIG. 1 according to certain aspects of the disclosure.

FIG. 2 is a block diagram 200 illustrating an example server 110 and a client 120 in the system 100 of FIG. 1 according to certain aspects of the disclosure. The server 110 and the client 120 are connected over the network 130 via respective communications modules 214 and 224. The communications modules 214 and 224 are configured to interface with the network 130 to send and receive information, such as data, requests, responses, and commands to the other devices or systems on the network. The communications modules 214 and 224 may be, for example, modems, Ethernet cards or mobile broadband adaptors.

The server 110 includes a processor 212, the communications module 214 and a memory 216 that includes one or more email templates 232, one or more emails 234, an email template generation module 236, and an email generation module 238. The memory 216 may also include a contact list 240 and one or more personalized email bodies 242. The email template generation module 236 stores instructions for displaying the email template generation UI and generating an email template 232 based on user input. The email generation module 238 stores instructions for generating an email based on an email template 232 and user input. The contact list 240 stores the contact information of the user's contact entities. The contact information stores information such as, for example, the contact entities' email addresses, names, and home/work addresses. The personalized email body 242 is generated based on the email template 232 by replacing the symbols of the email template with their default values or prompt messages, depending on the type of the symbols. The email 234 is generated based on the personalized email body 242 and user inputs.

The client 120 includes a processor 222, the communications module 224, and a memory 226 that includes a client application 244. The client application 244 may provide the user an interface to provide input for generating the email 234 using the templates 232. The client application 244 may be, for example, an email client, a web browser, or an application of a mobile device. The client 120 also includes an input device 202, such as a keyboard, touch screen, or mouse, to receive user inputs. The client 120 further includes an output device 204, such as a monitor, printer, or projector. Instructions for causing the processors 212 and 222 to generate and send an email using predefined templates are also stored in the memory 216 and memory 226. The instructions may be spread across the memories 216 and 226, or may be stored entirely in either memory 216 or 226. The instructions may be physically coded to the processors 212 and 222. The instructions may be spread across the processors 212 and 222, or may be entirely encoded in either processor 212 or 222.

While FIG. 2 illustrates both the server 110 and the client 120 communicating with each other over the network 130, the system 100 may comprise only the server 110 incorporating all the features of the client 120. The system 100 also may include only the client 120 incorporating all the features of the server 110.

FIG. 3 is a conceptual diagram 300 illustrating an example process of a system for sending email using predefined templates (e.g., system 100). An example email template 310 is illustrated in FIG. 3. The email template 310 may be, for example, an email template 232. The example email template 310 includes an email body 312 including a standard language to become part of an email, a personalization symbol 314, and a placeholder symbol 316. While the example email template 310 includes both the personalization symbol 314 and the placeholder symbol 316, an email template 232 may include either only personalization symbol 314 or only placeholder symbol 316.

The personalization symbol 314 represents a default value determined based on a predetermined rule. The predetermined rule may be, for example, identifying the name of the symbol and fetching a value based on the identified name. More specifically, the rule may instruct the system that if the name of the personalization symbol 314 is "$f_receiver$", identify the email address of the recipient from the "To:" field, determine the first name of the recipient based on the contact list 240, and replace the personalization symbol with the first name of the recipient. As another example, if the personalization symbol 314 is "$f_todays_date$", identify today's date from a system calendar and replace the symbol with today's date. Other types of personalization symbols and predetermined rules may also be available. If the user selects the email template 310, the system converts the personalization symbol 314 to a default value according to the predetermined rule.

The example email 310 also includes a placeholder symbol 316. The placeholder symbol 316 is associated with a prompt message. If the user selects the email template 310, the system converts the placeholder symbol 316 with the associated prompt message. The placeholder symbol 316 and its associated prompt message may be predefined in the system. The placeholder symbol 316 and its associated message may also be received from the user. The prompt message associated with the placeholder symbol 316 replaces the placeholder symbol when the user applies the email template 310, and prompts the user to type in a desired message in place of the prompt. For example, the placeholder symbol 316 is replaced with bold-faced text placed among the text of the email body 312 such that the prompt message may be easily identified by the user. The user may recognize the prompt message, and type in a custom message in the place of the prompt message.

When the user selects the email template 310 and applies the template to an email, the system replaces any personalization symbol 314 and placeholder symbol 316 of the template 310 with appropriate values or messages as described above, and generates a personalized email body 330 (e.g., personalized email body 242). In the example personalized email body 330, the personalization symbol 314 is replaced with its default value 332. As discussed above, the system replaces the personalization symbol 314 based on a predetermined rule for the symbol. The personalization symbol 314 illustrated in FIG. 3 is for a first name of the recipient, and its associated predetermined rule causes the system to look up the first name of the user in a contact list (e.g., contact list 240) based on an email address in the "To:" field. Therefore, in the example personalized email body 330, the system replaced the symbol 314 with the first name of the recipient as a default value 332.

The example email template 310 also includes a placeholder symbol 316. FIG. 3 illustrates a placeholder symbol 316 which has an associated prompt message 334 which reads "PLEASE TYPE IN YOUR PERSONALIZED SIGNATURE HERE." Therefore, in the example personalized email body 330, the system replaced the placeholder symbol 316 with the prompt message 334 in the text of the email body 312.

The user may view the example personalized email body 330, and recognize the prompt message 334. Based on the text of the prompt message 334, the user may replace the prompt message with a desired custom message. The prompt message 334 is made prominent to the user so that the user may easily identify the prompt message. For example, the text of the prompt message 334 may be in all capital letters, bold faced, highlighted, or encased in a box. Other means for making the prompt message 334 may also be used such as, for example, flashing the message prompt, displaying a pop-up window pointing to the prompt message, having a font different from the rest of the email body 330, or preceding and following the prompt message with a special character such as "*".

The default value 332 is also made prominent to the user, so that the user may easily identify them. The default value 332 may be made prominent in the same manner as the prompt message 334. The default value 332 may also be made prominent in a manner different from the prompt message 334 so that the user may easily distinguish between the two. The user may identify the default value 332, and may choose to override the default value with a desired value or message. For example, in the example personalized email body 330, the system replaced the personalization symbol 314 with the default value 332 which reads "Joe." However, the user may wish to replace the default value 332 with a value which reads "Mr. Smith."

The system may provide a symbol list UI (not shown) which displays a list of the default values 332 and prompt messages 334 of the example personalized email body 330. Using the symbol list UI, the user may conveniently identify the prompt messages 334 and replace the prompt messages with custom messages. The user may also use the symbol list UI to identify any default values 332 that the user may wish to override.

FIG. 3 also shows an example finalized email 350 (e.g., email 234). The email includes the personalized email body 330. In the finalized email, the prompt messages 334 of the personalized email body 330 and any default values 332 that the user wishes to override with a new value may be replaced. The finalized email 350 illustrates that the user did not opt to change the default value 332, but replaced the prompt message 334 with a custom message 352, which reads "Yours truly." The system may notify the user if the user has not replaced all prompt messages 334 with custom messages 352. For example, a pop-up window pointing to the prompt messages 334 may be displayed to the user if the user tries to send out the finalized email 350 without replacing the prompt messages. In an aspect of the invention, the system will not allow the user to send out the finalized email 350 unless all the prompt messages 334 have been replaced. The finalized email 350 also includes features such as, for example, a "To:" field and a subject line.

Figure 4:
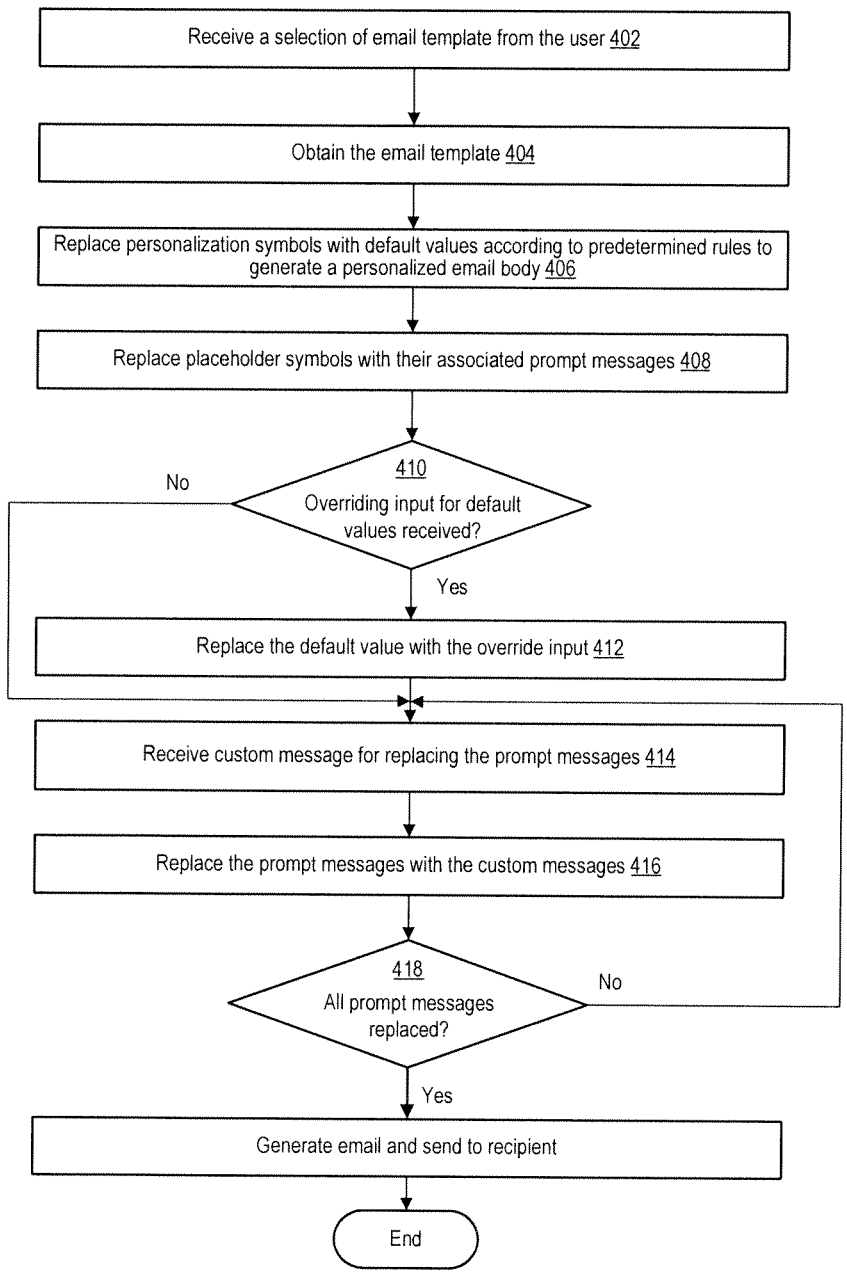
FIG. 4 illustrates an example flow diagram of instructions a processor of the system may execute according to certain aspects of the disclosure.

FIG. 4 illustrates an example flow diagram 400 of instructions for sending email using predefined templates. The instructions may be executed, for example, by the processor 212. As discussed above, the instructions may also be executed, for example, by the processor 222 or by both processors 212 and 222. In step 402, the processor executes instructions to receive a selection of an email template (e.g., email template 232) from the user. In step 404, the email template is obtained, and in step 406, the processor executes instructions to replace any personalization symbols (e.g., personalization symbols 314) with their associated default values (e.g., default values 332) according to the predetermined rules, to generate a personalized email body (e.g., personalized email body 242). In step 408, placeholder symbols (e.g., placeholder symbols 316) are replaced with their associated prompt messages (e.g., prompt messages 334).

In step 410, the processor executes instructions to determine if any input from the user for overriding the default values is received. If such input is received, in step 412, the default value is replaced in the personalized email body based on the override input. If no such input is received or after step 412, in step 414, custom messages (e.g., custom messages 352) for replacing the prompt messages are received. In step 416, the prompt messages are replaced with the received custom messages in the personalized email body. In step 418, the processor executes instructions to determine whether all the prompt messages have been replaced. If so, in step 420, an email (e.g., email 234) is generated which includes the personalized email body and is sent to the recipient. If not all prompt messages are replaced, then the process is repeated from step 414.

Figure 5:
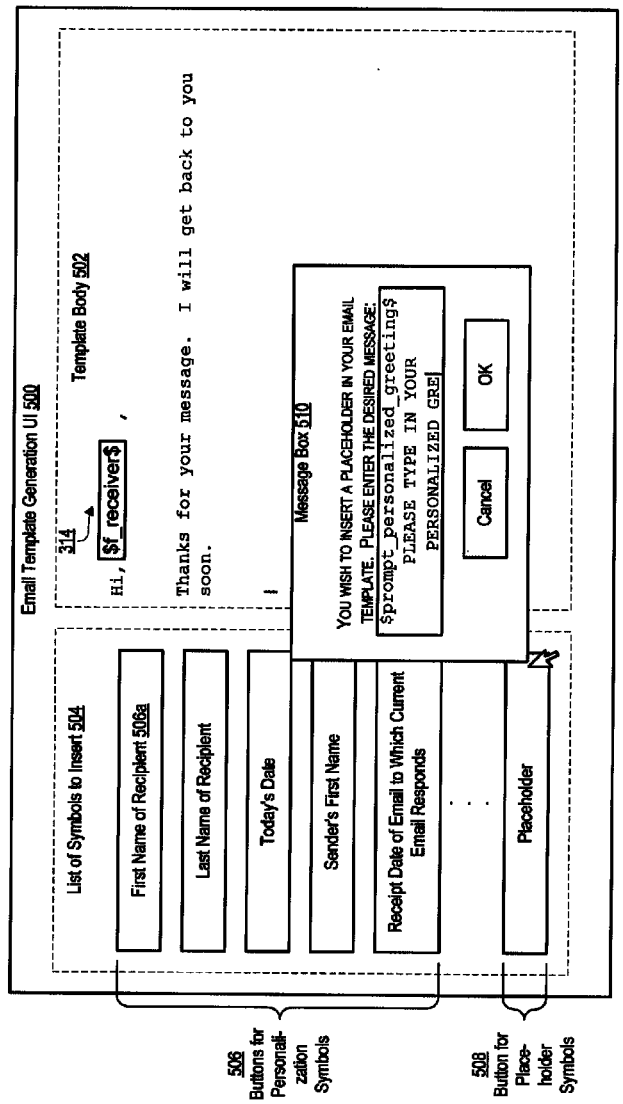
FIG. 5 illustrates an example email template generation user interface for generating the email template according to certain aspects of the disclosure.

FIG. 5 illustrates an example email template generation UI 500 for generating an email template (e.g., email template 232) according to certain aspects of the disclosure. An email template generation module (e.g., email template generation module 236) may store the instructions for generating the email template generation UI 500 and generating the email template based on the UI. The UI 500 includes a template body section 502 for displaying the email template being generated, and a list of symbols to insert 504, which lists available symbols to insert into the template. The list 504 includes the buttons 506 for inserting personalization symbols (e.g., personalization symbols 314), and a button 508 for inserting placeholder symbols (e.g., placeholder symbols 316). The user may click on one of the buttons 506 and 508 to insert a desired symbol into the email template. Each of the buttons 506 is associated with a predetermined symbol to be replaced according to predefined rules. For example, FIG. 5 illustrates that the user has clicked on a button 506a associated with inserting a symbol for a first name of the recipient. By clicking the button 506a, the user has inserted the personalization symbol into the template body 502. This symbol will be replaced with a default value (e.g., default value 332) according to a predetermined rule associated with this symbol when the user later selects the email template. The personalization symbol is identified by a predefined character to distinguish the symbol from the rest of the text of the email template. For example, the symbol may begin and end with a character "$". Other characters or identifiers may also be used, or other means may be used to distinguish the symbol from the rest of the text of the template body 502.

In an aspect of the invention, the UI 500 may also include a UI element (not shown) which allows the user to define a custom personalization symbol and its associated rule for replacing with a default value. For example, if the user does not see a button 506 corresponding to a desired type of personalization symbol, the user may access a separate button for defining a custom personalization symbol to define the desired symbol and its associated rules. A separate application programming interface ("API") may be provided for defining the symbols and rules.

FIG. 5 also illustrates that the user has clicked on the button 508 to insert a placeholder symbol. After the user clicks on the button 508, the user is prompted to indicate the desired placeholder symbol. The user is prompted by being displayed a message box 510. The message box 510 prompts the user to enter a desired placeholder symbol and its associated prompt message (e.g., prompt message 334). A list of predefined placeholder symbols which have predetermined associated prompt messages may be shown to the user in the message box 510. The user may select a predefined symbol from the list, and the selected symbol is inserted into the email template. In this case the user does not have to provide a separate associated prompt message since one has been already predefined in the system. The user may also define his or her own placeholder symbol and its associated prompt message. The message box 510 shows a user entering in his or her own symbol and prompt message.

Figure 6:
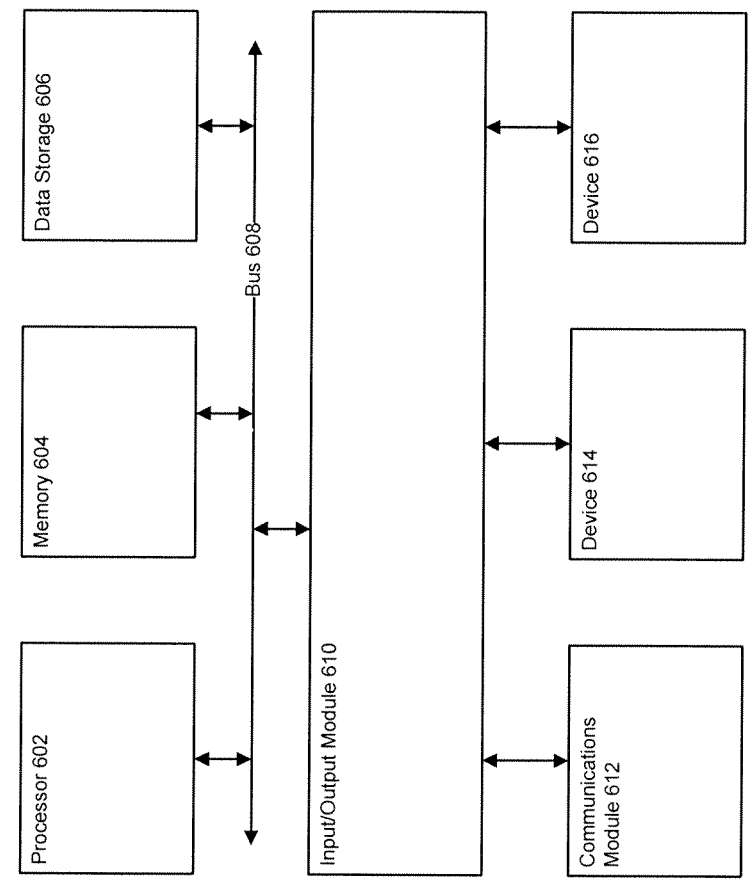
FIG. 6 is a block diagram illustrating an example computer system with which the server and the client of the system may be implemented according to certain aspects of the disclosure.

FIG. 6 is a block diagram illustrating an example computer system 600 with which the server 110 and the client 120 of the system 100 may be implemented. In certain aspects, the computer system 600 may be implemented using hardware or a combination of software and hardware, either in a dedicated server, or integrated into another entity, or distributed across multiple entities.

Computer system 600 (e.g., server 110 and client 120) includes a bus 608 or other communication mechanism for communicating information, and a processor 602 (e.g., processors 212 and 222) coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., memories 216 and 226), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer-readable medium for execution by, or to control the operation of, the computer system 600, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variables or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Example input/output modules 610 include data ports such as USB ports. The input/output module 610 is configured to connect to a communications module 612. Example communications modules 612 include networking interface cards, such as Ethernet cards and modems. In certain aspects, the input/output module 610 is configured to connect to a plurality of devices, such as an input device 614 and/or an output device 616. Example input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 816 include display devices, such as a CRT (cathode ray tube) or LCD (liquid crystal display) monitor, for displaying information to the user, and printing devices, such as a laser printer, an ink jet printer or a dot matrix printer.

According to one aspect of the present disclosure, the server 110 and client 120 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 130) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 804. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method comprising:
   receiving an indication of a selection of an electronic message template from a user, wherein the electronic message template is stored in a data structure and wherein the electronic message template comprises a predefined personalization symbol and a placeholder symbol for personalizing the electronic message template;
   obtaining the electronic message template from the data structure;
   generating content for inclusion in a personalized email body based on the electronic message template, the step of generating comprising replacing the predefined personalization symbol, based on a predefined rule, with a default value associated with the predefined personalization symbol;
   prompting the user to enter a custom message based on the placeholder symbol;
   receiving the custom message from the user;
   incorporating the custom message into the personalized email body; and
   providing a draft electronic message comprising the personalized electronic message body to the user, wherein the draft electronic message is prevented from being sent by the user until the custom message has been received and incorporated.

2. The method of claim 1, wherein receiving comprises receiving the selection of the electronic message template at a drop-down menu comprising identifiers of a plurality of email templates.

3. The method of claim 1, further comprising prominently displaying the default value over the remainder of the personalized electronic message body.

4. The method of claim 1, further comprising:
   receiving an override input for overriding the default value, the override input including an override value; and
   replacing the default value with the override value.

5. The method of claim 1, further comprising generating the electronic message template, comprising:

receiving, at a first button associated with the personalization symbol, a personalization symbol insert input for inserting the personalization symbol into the electronic message template; and inserting the personalization symbol into the electronic message template.

6. The method of claim 1, wherein the prompting step comprises replacing the placeholder symbol with a prompt message, and wherein the incorporating step comprises replacing the prompt message with the received custom message.

7. The method of claim 6, further comprising prominently displaying the prompt message over the remainder of the personalized electronic message body.

8. The method of claim 1, further comprising generating the electronic message template, comprising:

receiving, at a second button associated with the placeholder symbol, a placeholder symbol insert input for inserting a second personalization symbol into the electronic message template; and inserting the placeholder symbol into the electronic message template.

9. The method of claim 1, wherein the generating step further comprises determining that the custom message is received.

10. A system comprising:

a memory storing an email template comprising a predefined personalization symbol and a placeholder symbol for personalizing the email template, and storing executable instructions; and a processor configured to execute the stored executable instructions to:

receive a selection of the email template from a user;

obtain the email template from the memory;

generate content for inclusion in a personalized email body based on the email template, the step of generating comprising replacing the personalization symbol, based on a predefined rule, with a default value associated with the personalization symbol;

prompt the user to enter a custom message based on the placeholder symbol;

receive the custom message from the user;

incorporate the custom message into the personalized email body; and provide a draft email comprising the personalized email body to the user, wherein the draft email is prevented from being sent by the user until the custom message has been received and incorporated to replace the prompt.

11. The system of claim 10, wherein the receiving step comprises receiving the selection of the email template at a drop-down menu comprising identifiers of a plurality of email templates.

12. The system of claim 10, wherein the processor is further configured to prominently display the default value over the remainder of the personalized email body.

13. The system of claim 10, wherein the system is further configured to receive an override input for overriding the default value, the override input including an override value, and replace the default value with the override value.

14. The system of claim 10, wherein the processor is further configured to generate the email template, wherein the generating step comprises receiving, at a first button associated with the personalization symbol, a personalization symbol insert input for inserting the personalization symbol into the email template, and inserting the personalization symbol into the email template.

15. The system of claim 10, wherein the prompting step comprises replacing the placeholder symbol with a prompt message, and the incorporating step comprises replacing the prompt message with the received custom message.

16. The system of claim 15, wherein the processor is further configured to prominently display the prompt message over the remainder of the personalized email body.

17. The system of claim 10, wherein the processor is further configured to generate the email template, wherein generating the email template comprises:

receiving, at a second button associated with the placeholder symbol, a placeholder symbol insert input for inserting a second personalization symbol into the email template; and inserting the placeholder symbol into the email template.

18. The system of claim 10, wherein generating the email further comprises determining that the custom message is received.

19. A non-transitory machine-readable storage medium comprising machine-readable instructions for causing a processor to execute a method, the method comprising:

receiving a selection of an email template from a user, wherein the email template is stored in a data structure and wherein the email template comprises a predefined personalization symbol and a placeholder symbol for personalizing the email template;

obtaining the email template from the data structure;

generating content for inclusion in a personalized email body based on the email template, the step of generating comprising:

replacing the personalization symbol, based on a predefined rule, with a default value associated with the personalization symbol, and replacing the placeholder symbol with a prompt message for prompting the user to enter a custom message;

receiving the custom message;

incorporating the custom message into the personalized email body; and providing an email comprising the personalized email body to a recipient, wherein the email is prevented from being sent by the user until the custom message has been received and incorporated.

* * * * *